(12) United States Patent
Belashchenko et al.

(10) Patent No.: US 7,261,556 B2
(45) Date of Patent: Aug. 28, 2007

(54) COMBUSTION APPARATUS FOR HIGH VELOCITY THERMAL SPRAYING

(76) Inventors: Vladimir Belashchenko, 9 Irving Dr., Concord, NH (US) 03301; Andrei Voronetski, 91-4 Oktjabrskaja Str, Ap. 53, Moscow (RU) 127521

( * ) Notice: Subject to any disclaimer, the term of this patent is extended or adjusted under 35 U.S.C. 154(b) by 77 days.

(21) Appl. No.: 10/844,110

(22) Filed: May 12, 2004

(65) Prior Publication Data

US 2005/0255419 A1    Nov. 17, 2005

(51) Int. Cl.
F23D 11/44      (2006.01)
F23Q 9/00       (2006.01)

(52) U.S. Cl. .................. 431/11; 431/207; 431/278

(58) Field of Classification Search ............ 431/11, 431/207, 233, 278, 351; 60/736, 740, 750
See application file for complete search history.

(56) References Cited

U.S. PATENT DOCUMENTS

| | | | |
|---|---|---|---|
| 4,865,252 A | 9/1989 | Rotolico et al. | |
| 4,911,363 A | 3/1990 | Webber | |
| 5,120,582 A | 6/1992 | Browning | |
| 5,253,474 A | * | 10/1993 | Correa et al. .............. 60/768 |
| 5,285,967 A | 2/1994 | Weidman | |
| 5,932,293 A | 8/1999 | Belashchenko et al. | |
| 6,003,788 A | 12/1999 | Sedov | |
| 6,042,019 A | 3/2000 | Rusch | |
| 6,245,390 B1 | 6/2001 | Baranovski et al. | |

FOREIGN PATENT DOCUMENTS

RU      2056231 C1      3/1996

* cited by examiner

*Primary Examiner*—Alfred Basichas
(74) *Attorney, Agent, or Firm*—Grossman, Tucker, Perreault & Pfleger, PLLC

(57) ABSTRACT

A combustion apparatus is provided having a pre-combustion chamber and a combustion chamber. The pre-combustion chamber houses a preheating combustion for preheating and at least partially vaporizing fuel supplied to the pre-combustion chamber. The preheating combustion is controlled so that only a portion of the fuel supplied to the pre-combustion chamber is burned. The combustion apparatus further include a primary combustion oxidizer supply located downstream of said preheating combustion. The primary combustion oxidizer supply supplies an amount of oxidizer to allow the fuel not burned by the preheating combustion to burn.

22 Claims, 10 Drawing Sheets

COMBUSTION APPARATUS FOR HIGH VELOCITY THERMAL SPRAYING

FIELD

The present disclosure is directed at a combustion apparatus, and more particularly at a combustion apparatus that may be used to generate a high velocity stream of combustion gases.

BACKGROUND

High velocity spraying processes based on combustion of oxygen-fuel mixtures (HVOF) or air-fuel mixtures (HVAF) allow coatings to be sprayed from variety of materials. HVOF and HVAF processes may generally produce sonic and supersonic gas jets including combustion products of the oxygen-fuel or air-fuel mixtures. High quality coatings can be sprayed at a high level of efficiency when the temperature of the combustion products is high enough to soften or melt the particles being sprayed and the velocity of the stream of combustion products is high enough to provide the required density and other coating properties. Different materials require different optimum temperatures of the sprayed particles in order to provide an efficient formation of high quality coatings. Higher melting point materials, such as cobalt and/or nickel based alloys, carbides and composite materials, may often require relatively high temperatures in order to soften the particles to a level sufficient to efficiently form high quality coatings.

Some of the parameters affecting the available range of temperatures and velocities available from the combustion products are combustion pressure, types of fuel and oxidizer and ratio of fuel/oxidizer flow rates. Commonly used fuels may include gaseous and liquid hydrocarbon fuels like propane, propylene, MAPP gas, kerosene. Hydrogen may also be used as a fuel. Liquid fuels may provide some advantages over gaseous fuels. The use of liquid fuels may be less expensive than gaseous fuels and may be more easily fed into combustion apparatus at high pressure by using pumps or pressurized tanks. Some of gaseous fuels, for example, propane, are supplied in tanks at relatively low pressure. A tank of a gaseous fuel at low pressure may require pre-heating in order to provide a spraying gun with high pressure gaseous fuel. The pre-heating isn't attractive from safety standpoint.

Combustion devices and other parts of combustion apparatus may require cooling because of high temperatures of combustion. Cooling, however, may result in heat losses from the combustion apparatus to the cooling media. This heat loss may be a factor that can affect the efficiency of the process, for example by influencing the temperature and velocity of a combustion jet. Heat losses may depend, at least in part, on the intensity of the cooling and the surface areas of the combustion apparatus that are being cooled by a cooling media.

According to some designs, compressed air or oxygen is fed through air passages surrounding the combustion chamber and the barrel/nozzle assembly in order to cool these parts. The compressed air is then fed from the passages into the combustion chamber and is used as an air supply for the combustion process. This "regenerative" heat exchange may be economical and may reduce heat losses from the combustion. Oxygen has a relatively low cooling efficiency, however, and cooling using only oxygen may not be sufficient to prevent an HVOF system, which may generally operate at a higher temperature than an HVAF system, from overheating.

Oxygen/fuel mixtures may achieve high combustion temperatures, in some cases reaching temperatures of 3000 degrees C. or higher. To protect the apparatus from damage due to these extreme temperatures, water is commonly used as a cooling media for oxygen/fuel mixtures. In addition to the use of water cooling systems, combustion chambers for burning oxygen/fuel mixtures, as well as other components that will be exposed to high temperatures, are often manufactured from copper or copper alloys. Very efficient cooling may be achieved using water as a cooling medium in combination with copper or copper alloy components. Unfortunately, such efficient cooling may result in relatively large heat losses, especially in combustion systems having large internal surface areas and/or numerous turns in the path of combustion products.

SUMMARY

According to a first aspect, a combustion apparatus is provided including a pre-combustion chamber having an ignition zone and an exit, in which the pre-combustion chamber further includes a fuel inlet and a first oxidizer inlet adjacent the ignition zone, a second oxidizer inlet disposed adjacent the exit, and a third oxidizer inlet disposed between the ignition zone and the second oxidizer inlet. The combustion apparatus also includes a combustion chamber including an entrance and an exhaust, in which the entrance is in communication with the pre-combustion chamber exit.

According to another aspect, a method of generating a combustion exhaust stream is provided including providing a combustion system including a pre-combustion chamber and a combustion chamber. The method may further include providing a preheating combustion in said pre-combustion chamber and providing a primary combustion in said combustion chamber.

According to yet another aspect, a high velocity thermal spray apparatus is provided including a combustion module, a forming module, a powder injection module and a barrel module. The combustion module may include a pre-combustion chamber and a combustion chamber. The pre-combustion chamber may include a preheating combustion zone for evaporating at least a portion of fuel supplied to the pre-combustion chamber. The pre-combustion chamber may also include a primary combustion oxidizer supply for supplying an oxidizer supporting a primary combustion in the combustion chamber.

BRIEF DESCRIPTION OF DRAWINGS

Features and advantages of the claimed subject matter will be apparent from the following description of embodiments consistent therewith, which description should be considered in conjunction with the accompanying drawings, wherein:

FIG. 9b is a computer modeled illustration of the gas flow and shock waves schematically depicted in FIG. 9a;

DESCRIPTION

As an overview, the present disclosure may generally provide a combustion apparatus, such as a high velocity thermal spray (HVTS) apparatus. The HVTS apparatus may be provided including a first module providing a combustion module that may provide high temperature, high pressure gases as products of combustion. The combustion module may include a pre-combustion chamber and a combustion chamber. A second module of the HVTS apparatus may be configured as a forming module which may form or control the pressure and/or velocity profiles of the gases from the combustion module. According to one embodiment the forming module may accelerate the gases from the combustion module to provide a sonic or supersonic jet of gas. A third module may include a powder feeding module which may feed a powder to be sprayed by the HVTS apparatus into the gases produced in the combustion module. A fourth module may serve as a barrel in which the coating powder may be accelerated and heated by the gases from the combustion module. The modular design approach may allow separate modules to be provided having desired performance characteristics. The separate modules may be assembled to provide desired performance parameters for the HVTS apparatus as a whole. The separate modules may be provided, for example, to provide a desired performance for use with a particular fuel/oxidizer combination, spraying materials and requirement of coatings to be sprayed. Thus the system may provide different modules allowing a desired performance to be achieved for different conditions. According to one embodiment, the HVTS apparatus may be provided as a high velocity oxygen-fuel apparatus. According to another embodiment, the HVTS apparatus may be provided as a high velocity air-fuel apparatus. Other configurations may also may achieved consistent with the present disclosure.

Figure 1:
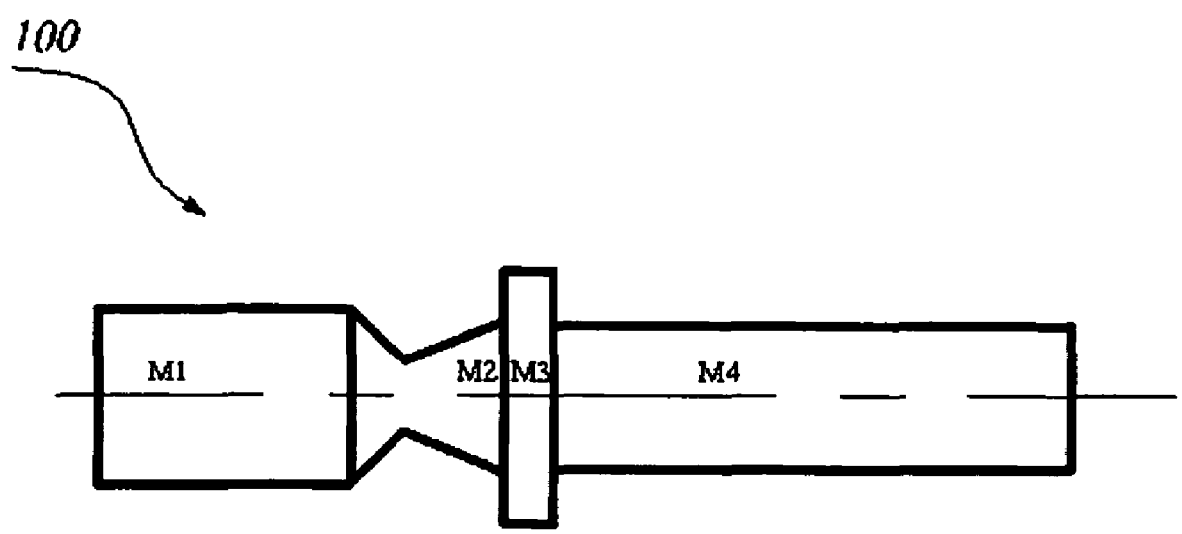
FIG. 1 is a schematic illustration of the an embodiment of a High Velocity Thermal Spray (HVTS) apparatus consistent with the present disclosure.

Referring to FIG. 1, an HVTS apparatus 100 is schematically illustrated including a combustion module M1, a forming module M2, a powder feeding module M3, and a barrel module M4. While an apparatus herein may generally be referred to as an HVTS apparatus, the apparatus may be configured as a HVOF (high velocity oxygen-fuel) apparatus, a HVAF (high velocity air-fuel) apparatus, and/or similar combustion systems producing an output including a stream of heated gaseous combustion products. While the HVTS apparatus 100 is schematically delineated in to four modules M1, M2, M3, M4 the HVTS apparatus 100 may include additional features or modules. Additionally, it is not necessary with the present disclosure that the four modules M1, M2, M3, and M4 be physically discrete or separable components. According to one embodiment herein, the combustion module M1 may be capable of operating at combustion pressures (Pcc) greater than between about 4-5 bars (0.4-0.5 MPa) and may produce combustion gases having a temperature Tcc, measured at the exit of the combustion module M1.

Figure 2:
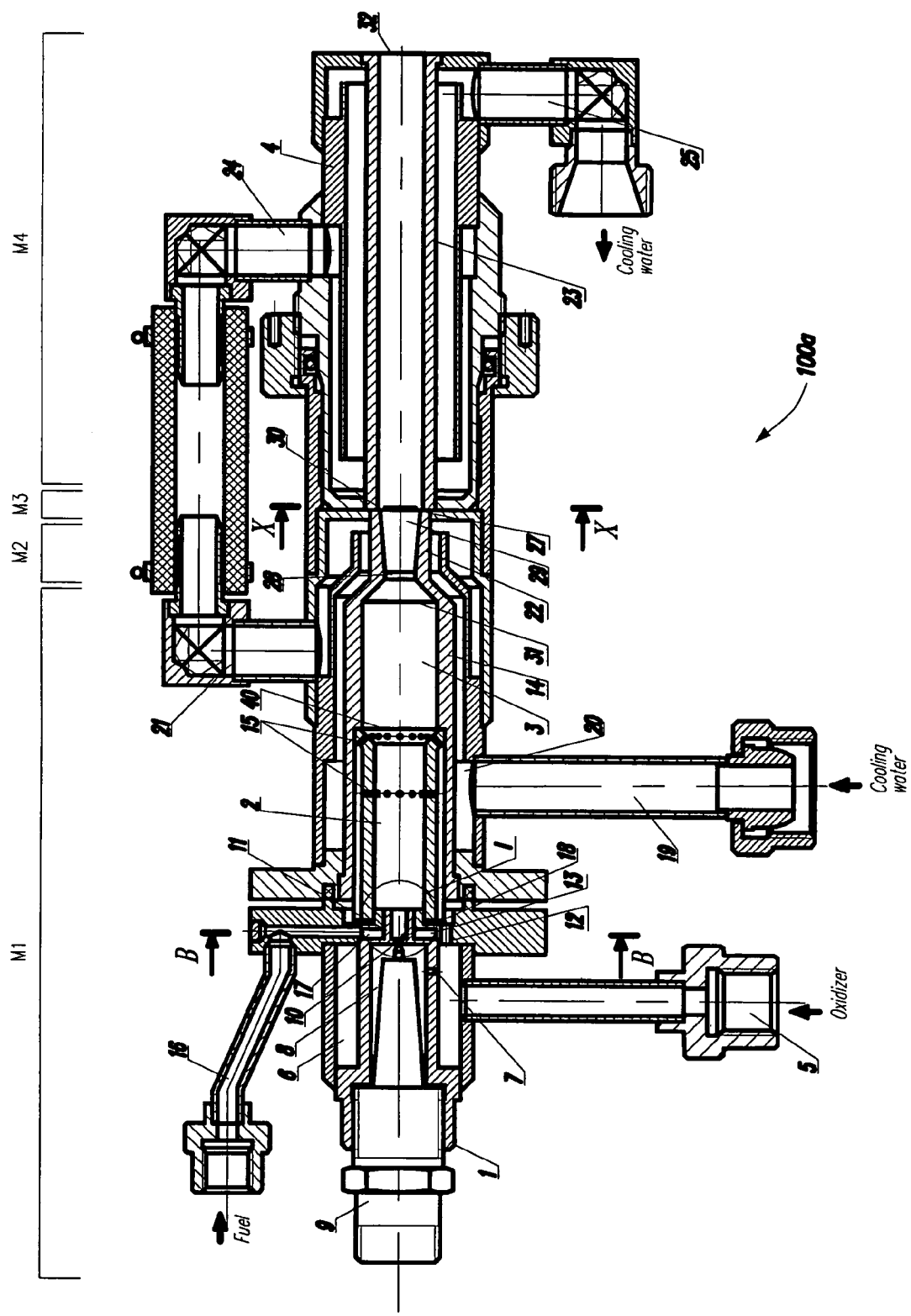
FIG. 2 is a cross-sectional view of an embodiment of an HVTS apparatus consistent with the present disclosure.

Turning to FIG. 2, an embodiment of an HVTS apparatus 100a consistent with the present disclosure is shown in cross-section. As shown, the combustion module M1 may include a pre-combustion chamber (herein "pre-chamber") 2, a combustion chamber 3, a spark plug housing 1, and a spark plug 9. As shown, the pre-chamber 2 and the combustion chamber 3 may be positioned adjacent to each other, with the pre-chamber 2 being disposed upstream of the combustion chamber 3. An oxidizer, such as gaseous oxygen, air, a liquid oxidizer, etc., and mixtures thereof, capable of supporting combustion, may be supplied to the combustion module M1 through a pipe or line 5, and may be introduced in to a circular oxidizer collector 6. A portion of the oxidizer supplied to the oxidizer collector 6 may be directed through a hole, or set of holes, 7 into a central zone 8 of the spark plug housing 1. The oxidizer may be further directed through the spark plug housing 1 and along the electrode 77 of the spark plug 9 disposed in a central channel 10 and into an ignition zone 11 that may open into the pre-chamber 2. The oxidizer flowing through the spark plug housing 1 and into the ignition zone 11, may flow across the electrode of the spark plug 77 and may cool the electrode and/or protect the electrode against overheating. According to one embodiment, between about 1% to 20% of the oxidizer introduced into the oxidizer collector 6 may be directed along the spark plug housing 1 and ultimately into the ignition zone 11. In a further embodiment, between about 5% to 10% of the oxidizer introduced in to the oxidizer collector 6 may be directed to the ignition zone 11 as described above.

Figure 3:
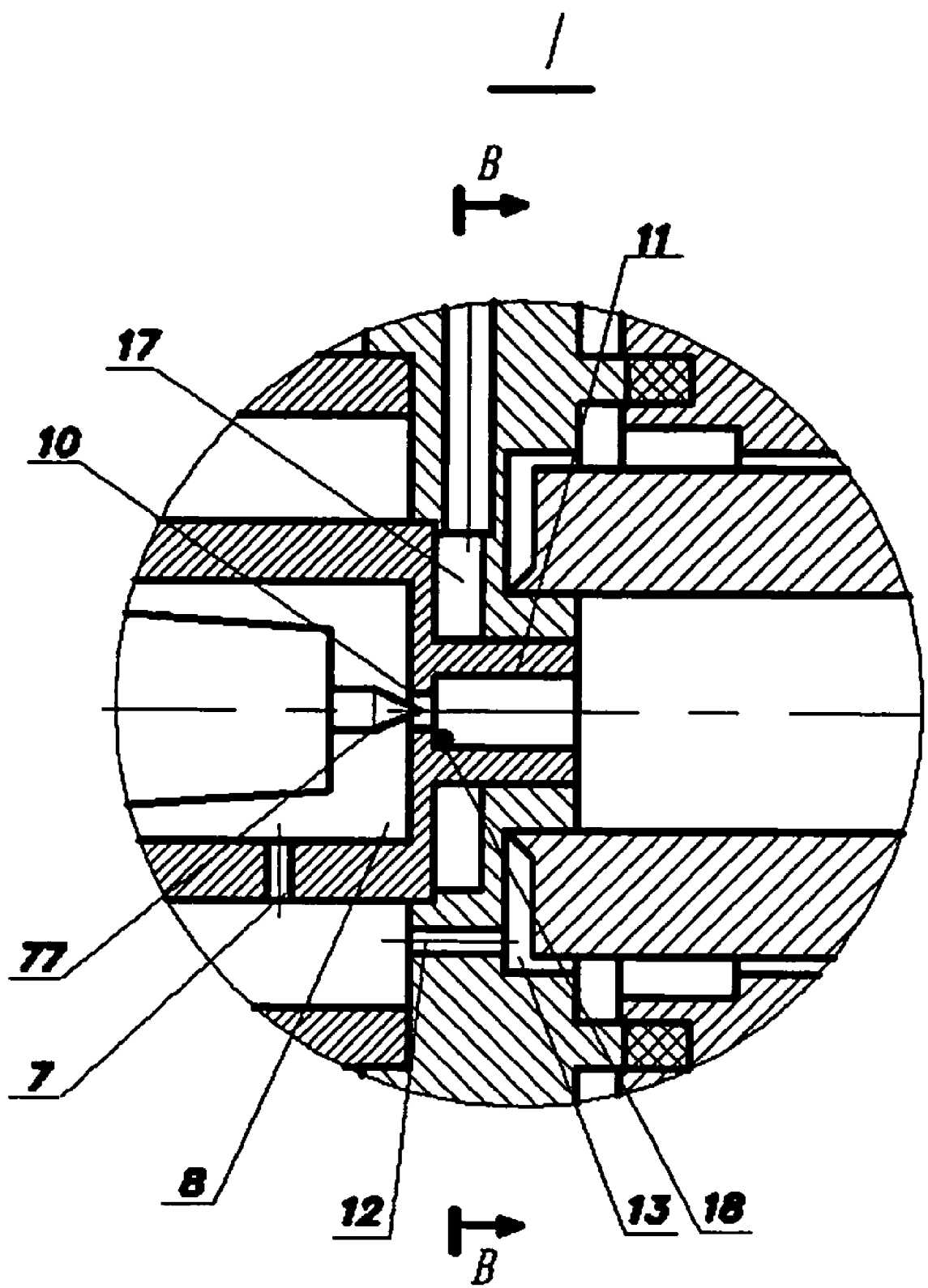
FIG. 3 is a detailed cross-sectional illustration of an upstream zone of an embodiment of a pre-chamber according to the present disclosure.
Figure 4:
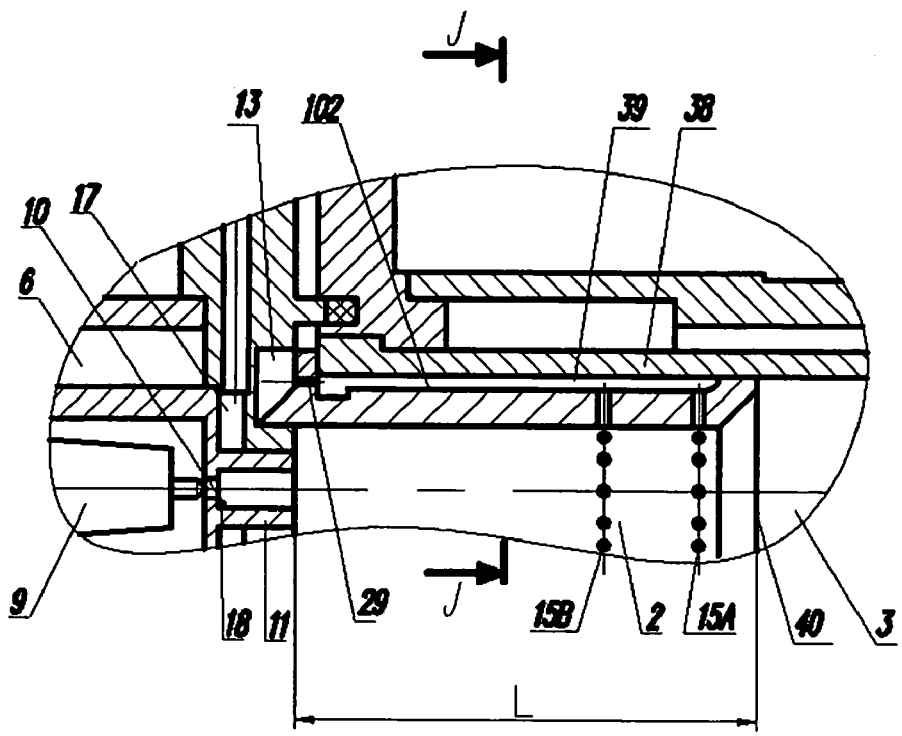
FIG. 4 is a detailed cut-away view of a portion of an embodiment of a pre-chamber according to the present disclosure.

With additional reference to FIGS. 3 and 4, the passages for the oxidizer are shown in greater detail. The holes 7 through the spark plug housing 1 and the central zone 8 of the spark plug housing 1 leading to the central channel 10 are readily apparent in the detailed view of FIG. 3. Alternative arrangements of passages may be provided for directing at least a portion of the oxidizer from the oxidizer collector 6 to the ignition zone 11. As best seen in FIG. 3, the portion of the oxidizer not directed to the ignition zone 11, may be directed to a second oxidizer collector 13, for example, through openings 12 in communication with the second oxidizer collector. With particular reference to FIG. 4, at least one oxidizer passage 39 may extend at least partially between an outer wall 102 of the pre-chamber 2 and a pre-chamber holder 38. The oxidizer passage 39 may include sets of holes 15A, 15B in communication with the pre-chamber 2 for directing the oxidizer from the second oxidizer collector 13 into a downstream zone of the pre-chamber 2. As oxidizer is directed through the passage 39, the oxidizer may cool the outer wall 102 of the pre-chamber 2. As the oxidizer is cooling the outer wall 102 of the pre-chamber 2, the oxidizer itself may be preheated.

Figure 5A:
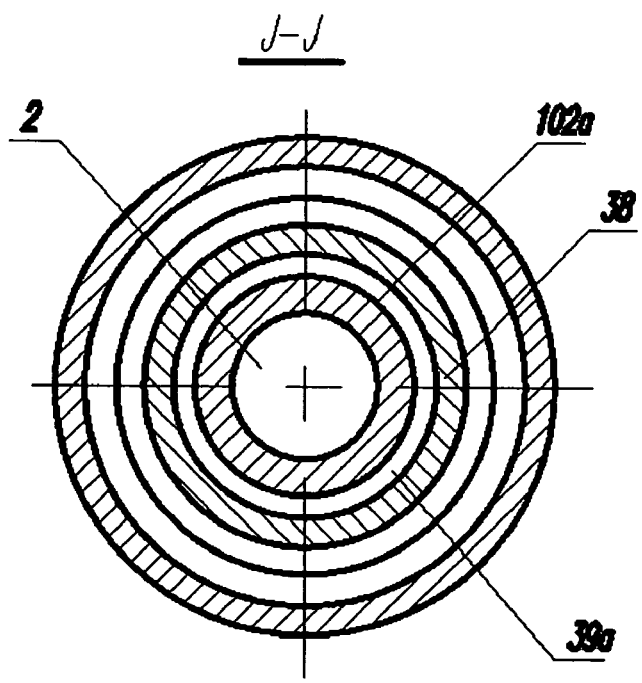
FIGS. 5a-b show sectional views of two embodiments of a pre-chamber, as taken along section line J-J of FIG. 4.

The outer wall 102 of the pre-chamber 2 may be provided having different configurations. With reference to FIG. 5a, in an embodiment in which the outer wall 102a is provided having a cylindrical configuration, the oxidizer passage 39a may be provided having a circular cross-section. According to such an embodiment, the oxidizer passage 39a may be provided by a space or gap disposed between the outer wall 102a of the pre-chamber 2 and the pre-chamber holder 38.

Figure 5B:
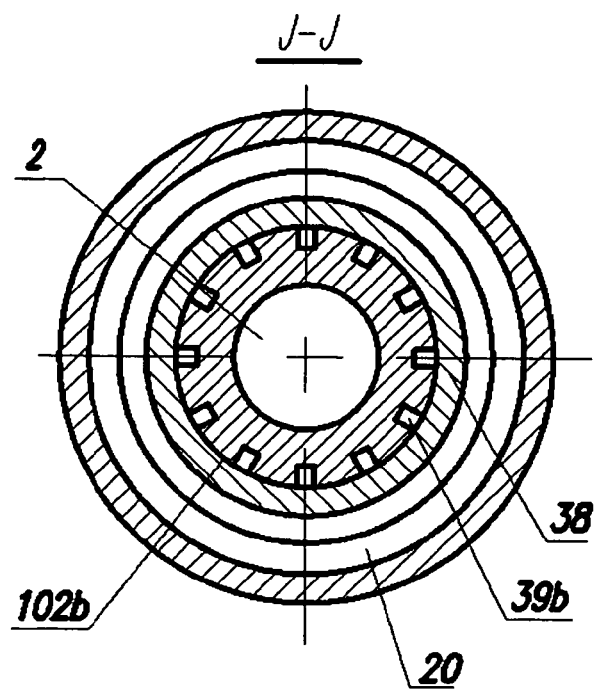

An embodiment of a second configuration of the outer wall 102b is shown in FIG. 5b. The oxidizer passage 39b may be provided as a plurality of individual channels disposed between the outer wall 102b of the pre-chamber 2 and the pre-chamber holder 38. Consistent with the illustrated embodiment, the oxidizer passage 39b may be provided as a plurality of discrete grooves disposed extending into the outer circumference of the outer wall 102b. The plurality of grooves providing the oxidizer passage 39b are depicted as extending generally axially with the pre-chamber 2. According to other embodiments, the oxidizer passages 39b may be provided as a groove in the inside diameter of the pre-chamber holder 38. In still another embodiment, the oxidizer passage 39b may be provided by cooperating grooves in both the pre-chamber outer wall 102b and the pre-chamber holder 38. Additionally, the oxidizer passages 39b need not extend generally axial with the pre-chamber 2. For example, the oxidizer passages 39b may be provided extending in a helical arrangement relative to the pre-chamber. Further alternative embodiments may suitably be employed for providing at least one oxidizer passage extending form the second oxidizer collector 13 and communicating oxidizer to the pre-chamber at an downstream zone thereof. Consistent with the embodiment illustrated in FIG. 5b, and variations thereon, at least a portion of the pre-chamber holder 38 may be in contact with at least a portion of the pre-chamber outer wall 102b. Enhanced cooling may be provided by cooling the pre-chamber holder 38, e.g. by water cooling. The contact between the pre-chamber holder 38 and the pre-chamber outer wall 102b may allow heat to be more efficiently conducted from the pre-chamber outer wall 102b to the cooled pre-chamber holder 38.

With reference back to FIG. 4, the sets of holes 15A, 15b may direct oxidizer from the passage 39 into a downstream zone of the pre chamber 2. According to one embodiment, the first set of holes 15A may be provided in a generally circular pattern distributed about the inside diameter of the pre-chamber 2. While the holes 15A may be evenly distributed about the inside diameter of the pre-chamber 2, this aspect is not essential. The first set of holes 15A may be located adjacent the pre-chamber exit. Locating the holes 15A in this position may provide oxidizer from the passage 39 to facilitate the final fuel vapor burning in the chamber 3.

The second set of holes 15B may also be provided in a generally circular pattern around the inside diameter of the pre-chamber 2. The second set of holes 15B may be located upstream in the pre-chamber 2 relative to the first set of holes 15A, that is, the second set of holes 15B may be disposed closer to the ignition zone 11 than the first set of holes 15A. According to one embodiment, the distance between the first set of holes 15A and the second set of holes 15B may be in the range of between about 0.1 to 0.7 L, wherein L is defined as the length of the pre-chamber 2. According to another embodiment, the distance between the first set of holes 15A and the second set of holes 15B may be in the range of between about 0.2 to 0.5 L.

Consistent with one embodiment, the oxidizer flow rate through the first set of holes 15A may be greater than the oxidizer flow rate through the second set of holes 15B. In one such embodiment, the flow rate of oxidizer through the first set of holes 15A may be in the range of between about 50% to 80% of the total oxidizer flow rate into the apparatus 100. Correspondingly, in such an embodiment the flow rate of oxidizer through the second set of holes 15B may be in the range of between about 10% to 40% of the total flow rate of oxidizer into the apparatus 100. A desired ratio of oxidizer flow rate through the holes 7, 15A, and 15B may be controlled by controlling the ratios of pressure drops through the various 1, 15A, 15B, and passages 12, 39. According to one embodiment, the ratio of oxidizer flow through the various set of holes, 7, 15A, 15B may be controlled by controlling the total surface area of each set of holes 7, 15A, 15B with respect to one another. The ratio of oxidizer flow rates through the various holes 7, 15A, 15B may also be controlled by introducing various flow restricting, or enhancing, features, for example, in the passages 12, 39. According to another aspect, the ratios of flow rates, as well as the position of the holes 15A, 15B and the length of the pre-chamber L may be adjusted to suit different fuels to achieve a desired level of combustion efficiency.

Consistent with one embodiment, the fuel used in the HVTS herein may be a liquid fuel. Suitable liquid fuels may include, but are not limited to, hydrocarbon fuel, such as, kerosene, alcohol, and mixtures thereof. Various other fuels may also suitably be used with an HVTS according to the preset disclosure. According to one embodiment, kerosene may be employed to provide a higher combustion temperature and higher heat output relative to an equal mass of alcohol. However, different grades of kerosene may have different chemical compositions and densities, and, therefore, may exhibit different combustion performances. Even the same grade of kerosene may allow some variations in combustions performance. Therefore, some adjustments of combustion parameters may be used for a particular grade of kerosene. Therefore, according to another embodiment, alcohol may provide a more consistent fuel, with various alcohols having a fixed chemical formulas and related properties. Accordingly, notwithstanding the lower combustion temperatures and lower heat outputs, alcohol may provide an advantageous fuel in some application, e.g., in which consistent combustion and consistent coating quality are required. Alcohol may also be attractive from safety standpoint, in that an alcohol fire may be extinguished using water in the case of an emergency.

Figure 6:
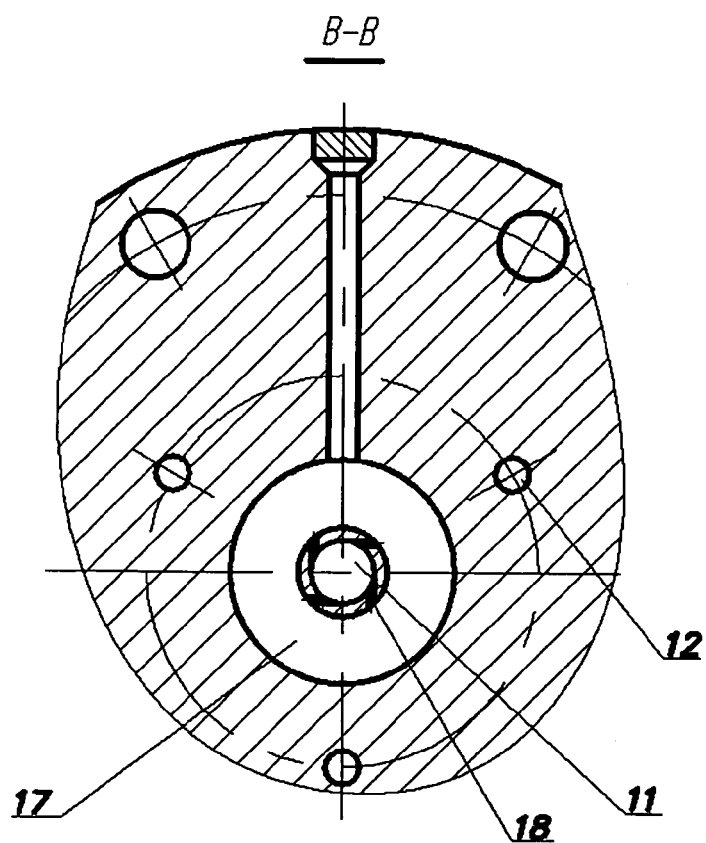
FIG. 6 illustrates a sectional view of the an upstream zone of an embodiment of a pre-chamber taken along section line B-B of FIG. 3.

Fuel may be supplied to the HVTS apparatus 100 via a fuel supply line 16 to a fuel collector 17. With reference to FIGS. 2, 3, and 6, according to one embodiment, the fuel collector 17 may be configured as a circular passage around the ignition zone 11. At least one delivery passage 18 may be provided extending between the fuel collector 17 and the interior of the ignition zone 11. As shown in the sectional view of FIG. 6, more than one fuel delivery passage 18 may be provided extending between the fuel collector 17 and the ignition zone 11. As shown in FIG. 3, the delivery passage 18 may be configured to provide fuel from the fuel collector 17 tangentially into the ignition zone 11. In this manner, a portion of the fuel delivered to the ignition zone 11 may be atomized and form fuel droplets. The portion of the fuel that is not atomized may form a thin film of fuel on the interior walls of the ignition zone 11. The thin film of fuel on the interior walls of the ignition zone 11 may extend into the pre-chamber 2. The thin film of fuel on the interior walls of the ignition zone 11 and the interior walls of the pre-chamber 2 may evaporate from the walls. Evaporation of the fuel may promote more efficient combustion of the fuel, and may also cool the walls of the ignition zone 11 and/or the pre-chamber 2 through evaporative cooling.

The atomized fuel and the fuel evaporating from the walls of the ignition zone 11 may mix with the oxidizer supplied to the ignition zone 11 through central zone 8 from the oxidizer collector 6. The spark plug 9 may ignite the oxidizer-fuel mixture and generate a pilot flame that may originate in the region of the ignition zone 11. The controlled supply of oxidizer in the ignition zone 11 and the limited quantity of fuel vapor in the ignition zone 11 may allow only a portion of the fuel delivered from the fuel collector 17 via the delivery passage 18 to combust in the ignition zone 11 and adjacent portion of the pre-chamber 2. Heat generated by the pilot flame, however, may begin to preheat the thin film of fuel on the walls of the ignition zone 11 and the pre-chamber 2. Preheating the fuel in this manner may also accelerate the evaporation of the thin film of fuel from the walls of the ignition zone 11 and pre-chamber 2.

More intense combustion of the fuel and the oxidizer may take place in downstream region of the pre-chamber 2 of the HVTS apparatus 100. For example, the flow of oxidizer from the second set of oxidizer holes 15B may allow larger-scale combustion of the fuel and oxidizer in the region adjacent the second set of oxidizer holes 15B. Heat generated by combustion in the region adjacent the second set of oxidizer holes 15B may produce further evaporation of fuel in the pre-chamber 2. The further evaporation of fuel in the pre-chamber 2 may supply the farther downstream regions of the pre-chamber 2 and combustion chamber 3 with fully vaporized fuel. Combustion of all of the fuel in the pre-chamber 2 adjacent the second set of oxidizer holes 15B may be prevented by controlling the flow rate of oxidizer through the second set of holes 15B. Oxidizer flowing through the pre-chamber 2 may provide cooling of the pre-chamber 2 and maintain the pre-chamber 2 at or near a desired temperature.

Final combustion of remaining fuel, which may have been vaporized by combustion adjacent the second set of oxidizer holes 15B, may occur in the combustion chamber 3 where the majority of the oxidizer, which is supplied through the first set of oxidizer holes 15A adjacent to the exit of the pre-chamber 2, is made available for combustion in the combustion chamber 3. Fuel vapor requires a smaller space and less time to achieve complete combustion, as compared with non-vaporized fuel. As the fuel supplied to the combustion chamber 3 may be at least partially vaporized, due to the heat of combustion adjacent the second set of oxidizer holes 15B, the volume and surface area of the combustion chamber 3 may be smaller than would be required for combusting liquid fuel.

The combustion chamber 3 of the HVTS apparatus 100a may be water cooled. The relatively small surface area of the combustion chamber 3 may, however, reduce heat losses, or extraction, from the combustion chamber to the cooling water. The reduced heat extraction by the cooling water may, in some embodiments, result in a high thermal efficiency of combustion and a high temperature of the combustion products, i.e. the combustion gases.

With reference to FIG. 2, cooling water, or some other cooling medium, may be supplied to the HVTS apparatus 100a through a cooling supply line 19 and into a water collector 20, in the general region of the pre-chamber 2 in the illustrated embodiment. Cooling water may pass from the water collector 20 and flow around the combustion chamber walls 14 to provide cooling for the combustion chamber 3. After the water has passed around the walls 14 of the combustion chamber 3, the water may pass through a by-pass system 21. The by-pass system 21 may include a barrel supply line 24, communicating the cooling water from the by-pass 21 to the barrel 4 of the HVTS apparatus 100a, allowing the barrel 4 to also be cooled by the same cooling system. The cooling water may exit the barrel 4 through a coolant discharge 25. The cooling water may be disposed of as waste water or re-circulated, and may, for example, be passed through a temperature conditioning circuit or a chiller.

Figure 7:
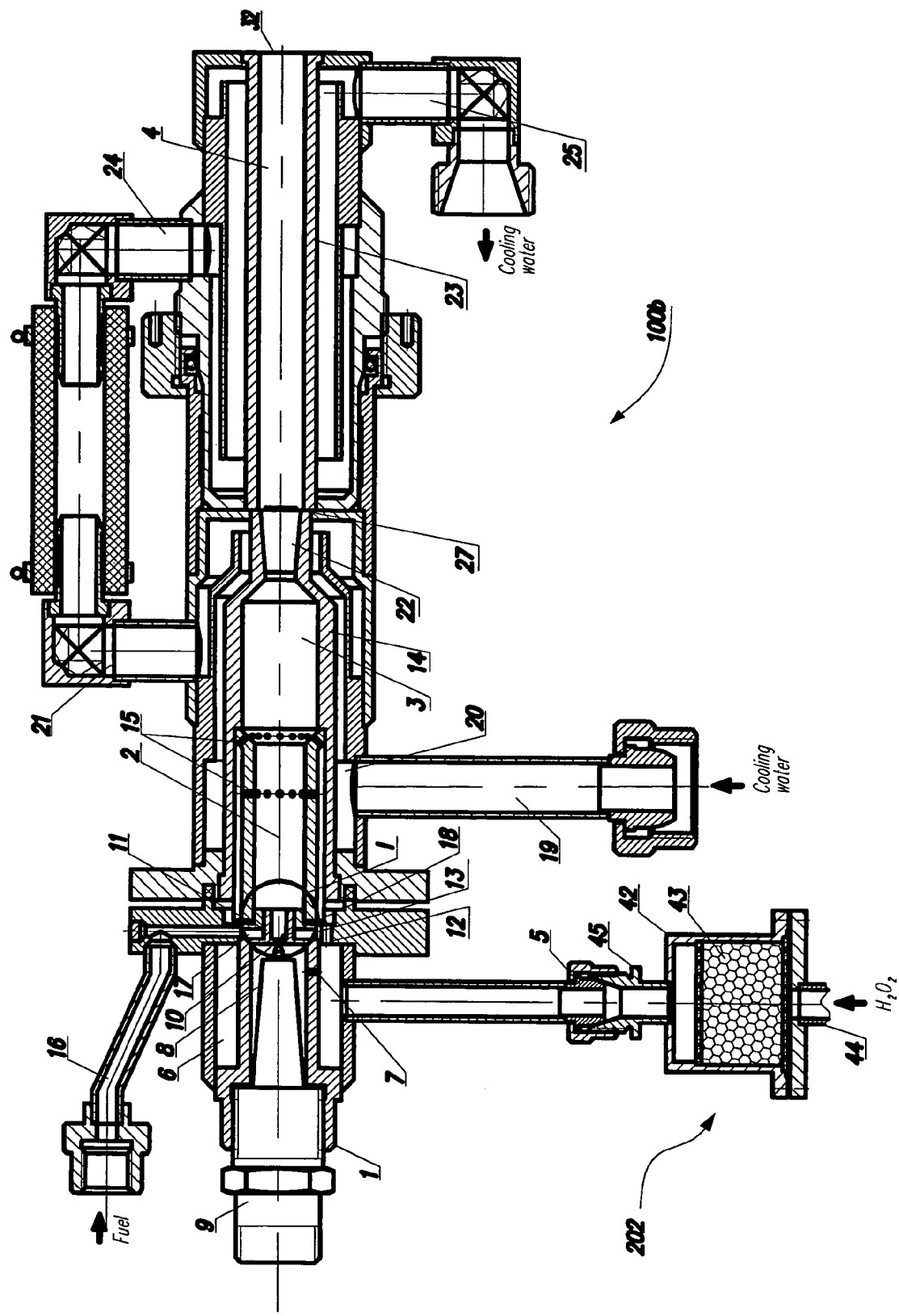
FIG. 7 is a cross-sectional view of an embodiment of an HVTS apparatus configured for use with a peroxide oxidizer according to the present disclosure.

Referring to FIG. 7, an embodiment of a HVTS apparatus 100b specifically adapted to the use of hydrogen peroxide or aqueous hydrogen peroxide solution as an oxidizer. In some cases, hydrogen peroxide may provide safety benefits, especially when provided in an aqueous solution having a hydrogen peroxide concentration less than about 70% by weight, for example arising from the greater ease of handling a liquid versus a gas, etc. Consistent with such an embodiment, the HVTS apparatus may be equipped with a hydrogen peroxide supply system 202. The hydrogen peroxide supply system may include a catalytic converter 42, which may be coupled to a hydrogen peroxide supply line 44. The hydrogen peroxide supply system 202 may include an outlet 45 for coupling the hydrogen peroxide supply system 202 to the oxidizer supply line 5 of the HVTS apparatus 100b. The catalytic converter 42 may include a catalytic structure 43, which may include a granular catalyst, catalyst disposed on a substrate, or a catalyst itself formed, for example in a honeycomb configuration, etc., to contact hydrogen peroxide flowing through the catalytic converter 42. The catalyst of the catalytic structure may convert liquid hydrogen peroxide, or an aqueous solution thereof, introduced from the supply line 44 into a gaseous, or semi-gaseous, state when it is introduced to the oxidizer supply line 5 of the HVTS apparatus 100b. The hydrogen peroxide, or aqueous solution thereof, may be preheated by the interaction with the catalytic structure. Additionally, or alternatively, the catalytic converter 42 may include a heating element for preheating the gaseous, or semi-gaseous, hydrogen peroxide supplied to the HVTS apparatus 100b. Various different catalysts may be employed to convert the hydrogen peroxide to a gaseous, or semi-gaseous, state, including, but not limited to, permanganates, manganese dioxide, platinum, and iron oxide. The combustion temperature achieved by the fuel-peroxide mixture may be influenced, at least in part, by the concentration of hydrogen peroxide utilized.

According to one embodiment, the combustion module M1 may operate at a pressure Pcc greater than about 4 bar to 5 bar (0.4-0.5 MPa), and may provide gases having a temperature Tcc at the outlet 31 of the combustion module M1. The pressurized and heated gases exiting the combustion chamber 3 travel into a gas channel 29 of the forming module M2. The forming module M2 may form, or shape, the flow of gases, e.g., shape a velocity profile of the flow of gases through the use of diffusers, nozzles, etc. The formed gases from the forming module M2 may then flow through a gas passage defined by the barrel tube 23 (hereinafter, "barrel") of the barrel module M4. The gases may then exit the barrel module M4 via the open end 32 of the barrel module M4.

The combustion module M1 described above may be used in combination with a variety of different forming modules, powder feeding modules, and/or barrel modules. Embodiments of specific forming modules, powder feeding modules, and barrel modules are described and illustrated with reference to FIGS. 8 through 14. The specific modules illustrated and described herein are provided as examples of modules that may suitably be used in combination with the combustion modules described above, and should not be considered to limit the design and/or configuration of forming modules, powder feeding modules, and/or barrel modules that may be used with the combustion module herein.

Figure 8:
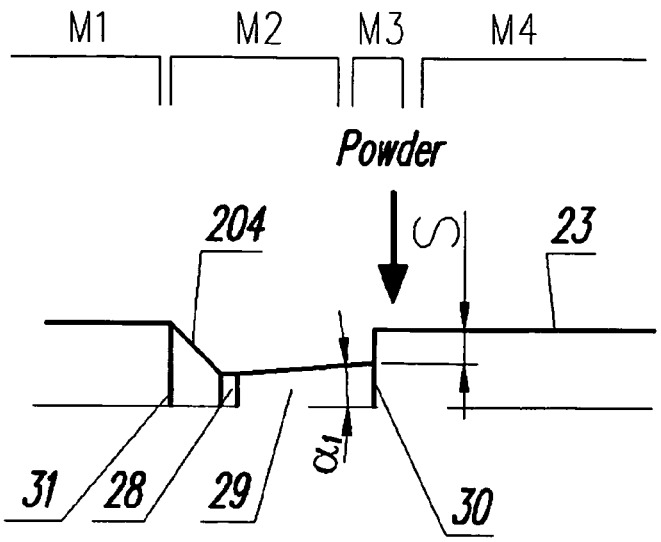
FIG. 8 is a schematic view of an embodiment of an exit of a forming module and an entrance of a barrel module according to the present disclosure.

Referring first to FIG. 8, a schematic profile of a forming module M2 and barrel module M3 that may suitably be used in combination with the combustion module M1 herein is shown. The illustrated modules may include several zones that may form, i.e., influence velocity and pressure profiles, etc., a flow, or stream, of combustion gases exiting a combustion module. From the combustion module exit 31, the gas passage may include a converging zone 204 in which the diameter of the gas passage is reduced. The converging zone 204 may terminate in a throat 28 having a diameter Dt. From the throat 28, the diameter of the gas passage may increase through an expansion zone 29, in which the stream of gas may accelerate. According to one embodiment, the expansion zone 29 may provide a gas pressure that is less than atmospheric at the exit of the expansion zone/entrance of the barrel 30. The exit of the expansion zone 29 may have a diameter Dne and a surface area Sne related to the diameter Dne.

Shock waves may be generated in the stream of gas as it flows through the barrel 23 of the HVTS apparatus 100, and/or during the transition from the expansion zone 29 to the barrel 23. The shock waves in the stream of gas may improve the thermal exchange between the heated gas and spraying particles introduced into the stream of gas. Additionally, shock waves in the stream of gas may concentrate spraying particles in the gas stream around the axis of the gas passage. Concentrating particles closer to the axis of the gas stream may reduce the occurrence of build up of particles on the barrel wall 23. Furthermore, concentrating particles along the axis of the gas stream may produce high exit velocities of the particles, which may, for example, increase the density of a sprayed coating.

According to one embodiment, shock waves may be generated in the stream of gas by changing the profile of the gas passage. Consistent with the embodiment depicted in FIG. 8, shock waves may be generated in the stream of gas by providing a step inside the gas passage. As shown, the diameter Dne of the gas passage at the exit 30 of the expansion zone 29 is less than the diameter Db1 of the gas passage at the entrance 30 of the barrel 23. The ratio between the diameter Db1 of the entrance 30 of the barrel 23 and the diameter Dne of the exit 30 of the expansion zone 29, i.e., Db1/Dne, may be provide in the range of between about 1.02 to 1.3. In a particular embodiment, the ratio Db1/Dne may be in the range of between about 1.05 to 1.25. Accordingly, the dimension S of the step formed between the expansion zone 29 and the barrel 23 is such that Db1>Dne. The difference between the diameter of the barrel Db1 and the diameter of the expansion zone is 2S.

Figure 9A:
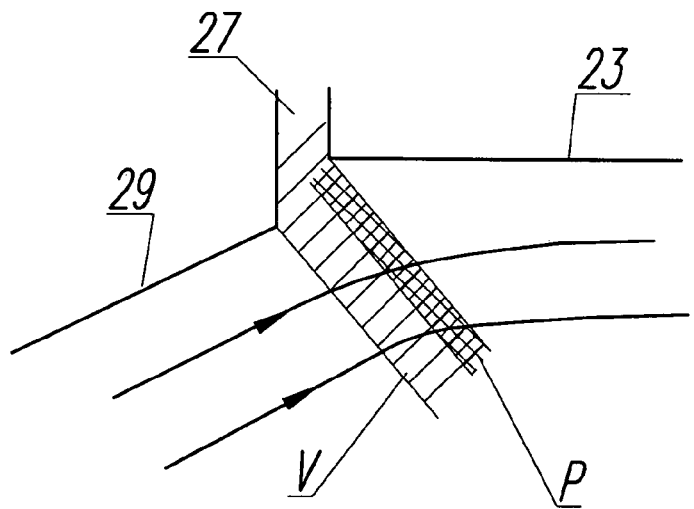
FIG. 9a is a schematic representation of a shock wave and a low pressure zone associated with an embodiment of an HVTS apparatus consistent with the present disclosure.
Figure 9B:
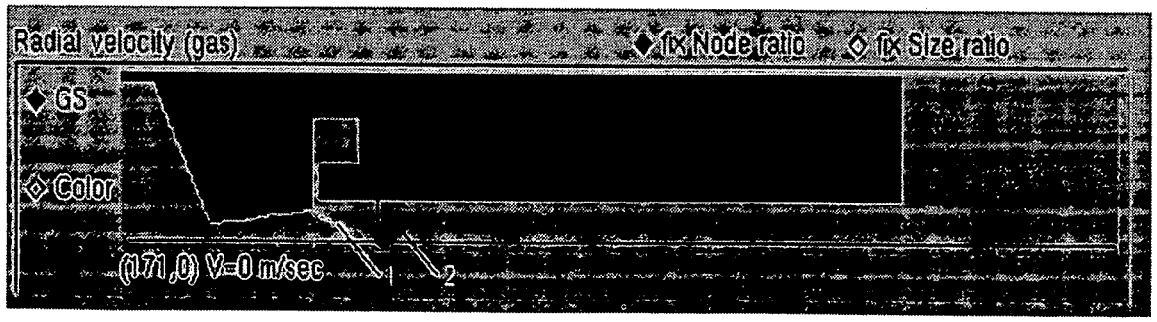

Consistent with this embodiment, the step may generate a shock wave having high and low pressure zones along the barrel, as illustrated in by FIGS. 9a and 9b. As shown in FIG. 9a, the position of the low pressure zone V and the high pressure zone P in the region of the step. FIG. 9b shows a computer generated representation of the general structure of a shock wave along the gas channel of a barrel 23 at a location downstream of the step. In the illustrated embodiments, a powder to be sprayed by HVTS apparatus may be introduced into the gas stream at the lower pressure region V, indicated in FIG. 9a.

The intensity of a shock wave generated by a given passage geometry and step size may be at least partially dependent upon the gas velocity or Mach number. The gas velocity itself may be at least partially dependent upon the combustion pressure and the expansion ratio, $\theta = Dne/Dt$, wherein Dne is the diameter of the gas passage at the exit 30 of the expansion zone 29 and Dt is the diameter of the throat 28. A higher expansion ratio may produce shock waves of greater intensity. However, increasing the expansion ratio may decrease the temperature of the combustion products, i.e., the gas stream. These characteristics may be varied to achieve shock waves having a desired intensity while still maintaining a sufficient temperature of the gas stream.

The expansion ratio may be determined according to the formula: $\theta = Kn (1.7+0.1 \, Pcc/Pa)$, in which Pcc is absolute pressure in the combustion module, Pa is atmospheric pressure, Kn is a coefficient determined through experimentation and modeling. According to one embodiment, the coefficient Kn may generally be in the range of between about 0.5 to 0.8, and may be in the range of between about 0.6 to 0.75. Furthermore, if Pcc is the surplus pressure, then $\theta = Kn (1.7+0.1(Pcc/Pa+1))$. Using this formula, according to an embodiment in which the coefficient Kn is in the range of between about 0.6-0.75 and in which the absolute combustion pressure Pcc=0.9 MPa, the expansion ratio $\theta$ may be in the range of between about 1.56-1.95. In an embodiment in which the absolute combustion pressure is about 1.3 MPa, the expansion ratio may be in the range of between about 1.8-2.25. Consistent with these general expansion ratios, the angle α1 of the expansion zone 29, shown in FIG. 8, may be about 3-10 degrees.

Figure 10:
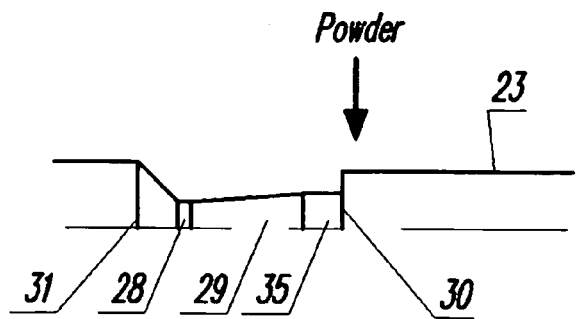
FIG. 10 schematically illustrates a cylindrical portion of an embodiment of a forming module exit consistent with the present disclosure.

The velocity of the gas stream through the expansion zone 29 may include radial components that are directed away from the axis of the gas passage. In some embodiments, these radial velocity components may be disadvantageous for the injection of powder into the gas stream. Turning to FIG. 10, according to one embodiment, the radial component of the gas velocity may be minimized in the region of powder introduction by providing a cylindrical exit portion 35 between the expansion zone 29 and the barrel 23. The length of the cylindrical zone 35 may generally be in the range of between about 0.25 to 2 times the diameter of the exit of the expansion zone 29, in some embodiments the length of the cylindrical zone 35 may be in the range of between about 0.5 to 1.5 time the diameter of the exit of the expansion zone 29. Consistent with this embodiment, the length of the expansion zone 29 may be decreased by increasing the expansion angle α1, discussed with reference to FIG. 8, while still maintaining the radial component of the velocity of the gas stream within a desired range allowing introduction of powder into the gas stream. Increasing the expansion angle, and thereby decreasing the length of the expansion region 29, may allow heat losses in the expansion zone 29 to be reduced. According to one embodiment utilizing a cylindrical exit region 35, the expansion angle α1 may be increase to an angle of about 15 degrees. The expansion angle may be varied depending upon the desired level of radial gas stream velocity components, as well as the length and diameter of the cylindrical exit region 35.

Figure 11:
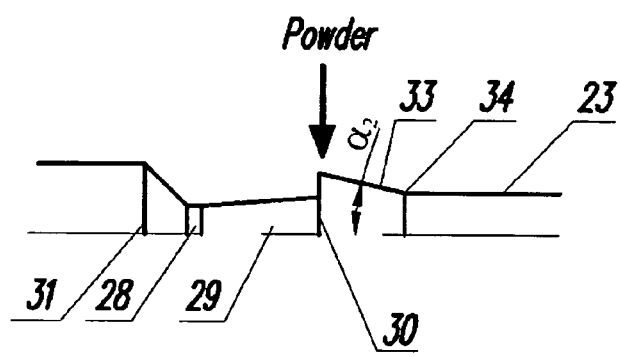
FIG. 11 schematically depicts a converging zone of a gas passage in an HVTS apparatus according to the present disclosure.

Referring to FIG. 11, another embodiment for reducing any undesired effects of radial outward components of a gas stream velocity is shown. In the illustrated embodiment, expansion zone 29 may have an expanding conical geometry, and may have an exit 30 into the barrel 23. The barrel 23 may include a converging zone 33 at the entrance 30 of the barrel 23. The converging zone 33 may provide an inwardly directed radial component to the gas stream velocity. The radial inward component of the gas stream velocity provided by the converging zone 33 may direct powder particles towards the axis of the gas passage. Directing powder particles toward the axis of the gas passage may reduce an accumulation of powder particles on the interior wall of the barrel 23. Furthermore, the transition 34 between the converging zone 33 and the cylindrical barrel 23 may also create additional shock waves that may also direct powder particles toward the axis of the gas passage. Such additional shock waves may, therefore, also reduce the accumulation of powder on the interior wall of the barrel 23.

According to one embodiment including a converging zone, the length of the converging zone 33 may be in the range of between about 0.25 to 2.0 times the diameter of the exit of the expansion zone, Dne. In a further embodiment, the length of the converging zone 33 may be in the range of between about 0.5 to 1.5 the diameter of the exit of the expansion zone, Dne. The converging zone 33 may have a converging angle of between about 1 to 10 degrees relative to the axis of the barrel 23, and according to one embodiment an angle of between about 3 to 8 degrees relative to the axis of the barrel 23. The step size between the expansion zone 29 and the entrance 30 of the converging zone 33 of the barrel 23 and the length of the converging zone 33 may be determined at least in part on the exit diameter of the barrel. According to one embodiment, the barrel 23 may have an exit diameter that is in the range of between about 0.5 to 1.5 times the exit diameter of the expansion zone, Dne. According to a further embodiment, the exit diameter of the barrel may be in the range of between about 0.75 to 1.25 times the exit diameter of the expansion zone, Dne.

According to one variation, the barrel 23 may be provided having a cylindrical zone at the entrance thereof 30. Following the cylindrical zone, the barrel 23 may include the converging zone 33. As with the preceding embodiment, the converging zone 33 may have a transition 34 into a cylindrical region of the barrel 23 leading to the exit thereof. Consistent with one such embodiment, the cylindrical region between the entrance 30 of the barrel and the converging zone 33 may have a length that is in the range of between about 0.25 to 1.25 times the exit diameter of the expansion zone, Dne. In another embodiment, the cylindrical region between the entrance 30 and converging zone 33 may have a length that is in the range of between about 0.5 to 1 times the exit diameter of the expansion zone, Dne.

Figure 12:
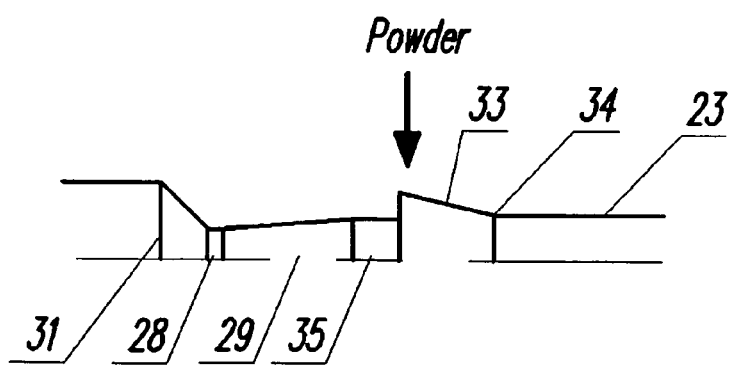
FIG. 12 is a schematic illustration of an embodiment of a cylindrical exit portion of a forming module and a converging zone inside a barrel of an embodiment of an HVOF apparatus according to the present disclosure.

Referring to FIG. 12, and embodiment of a gas forming module M2 combining the use of a cylindrical exit region 35 of the expansion zone 29 with a converging entrance region 33 of the barrel 23. Consistent with the illustrated embodiment, it may be possible to minimize a radial component of the gas stream velocity to a desired level, and to reduce the length of the expansion zone 29. Accordingly, it may be possible to reduce heat losses in the expansion zone 29 and to reduce accumulation of powder on the inside wall of the barrel 23.

Figure 13A:
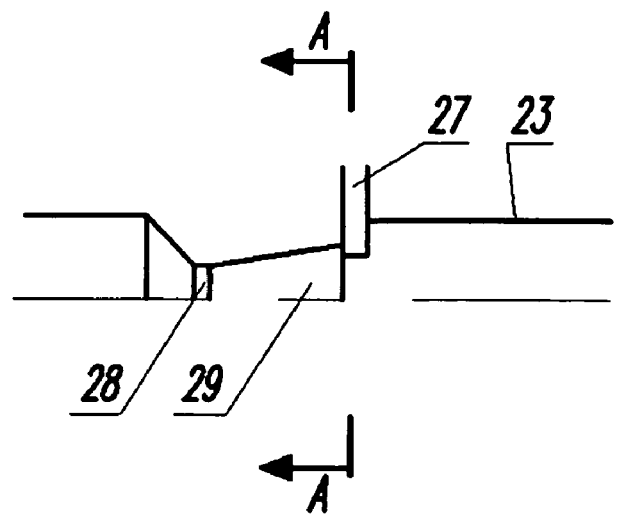
FIG. 13a schematically illustrates an embodiment of a powder injection region of a gas passage.
Figure 13B:
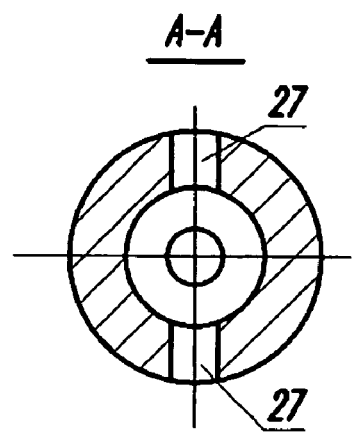
FIG. 13b is a sectional view of the embodiment of a powder injection region of a gas passage illustrated in FIG. 13a taken along section line A-A.

Turning next to FIGS. 13a and 13b, an embodiment of a powder injection region is shown. As discussed above, shock waves generated in the gas stream may generate a series of low pressure zones and high pressure zones along the barrel. One of the parameters involving the injection or introduction of powder into the gas stream is the velocity of powder injection. The injection velocity of powder into the gas stream, measured in a direction radial to the flow of the gas stream, and the injection position of powder may be influenced by the pressure in the powder injection zone Ppi. According to one embodiment, the powder material may be introduced into the gas stream at a low pressure zone. Furthermore, according to the illustrated embodiment, powder may be introduced into the gas stream at a location that is close the axis of the gas stream.

In the illustrated embodiment, powder may be introduced into the gas stream generally at the transition between the expansion zone 29 and the barrel 23. As shown, a passage 27, injection nozzle, etc. may be used for introducing a powder into the gas stream. The powder may be delivered through the passage 27 using a carrier gas. The passages 27 may be provided having a variety of configurations or geometries. For example, the passages 27 may be configured as cylindrical openings, or may be configured as slotted injectors, which may allow improved control of powder injection and positioning of the injected particles inside the barrel 23. Introducing the powder into a low pressure region of the gas stream may reduce the flow rate of a carrier gas required to inject the powder into a desired position within the gas stream. Reducing the flow rate of the carrier gas in this manner may also reduce the amount of cooling of the hot gas stream that is caused by the relatively cooler carrier gas. For example, flow rate of a carrier gas used to inject a powder into a powder injection zone in which the Ppi is about 0.15 MPa is approximately 2.5 times greater than the carrier gas flow rate necessary to achieve the same injection conditions in a powder injection zone in which the Ppi is about 0.05 MPa. According to one embodiment, the pressure in the powder injection zone may be in the range of between about 0.04 to 0.08 MPa, although injection may also suitably take place at locations exhibiting higher or lower pressures.

While the illustrated embodiment shows powder injection occurring at the low pressure zone associated with a step between the expansion zone 29 and the barrel 23, powder injection may be carried out at any low pressure zone located in the gas stream channel. In addition to providing powder injection at a low pressure zone, powder injection may be carried out at a region of high shock wave intensity, in order to take advantage of enhanced thermal exchange between the combustion gases and the powder. Injection powder into a region of high shock wave intensity, however, also is not necessary.

Figure 14:
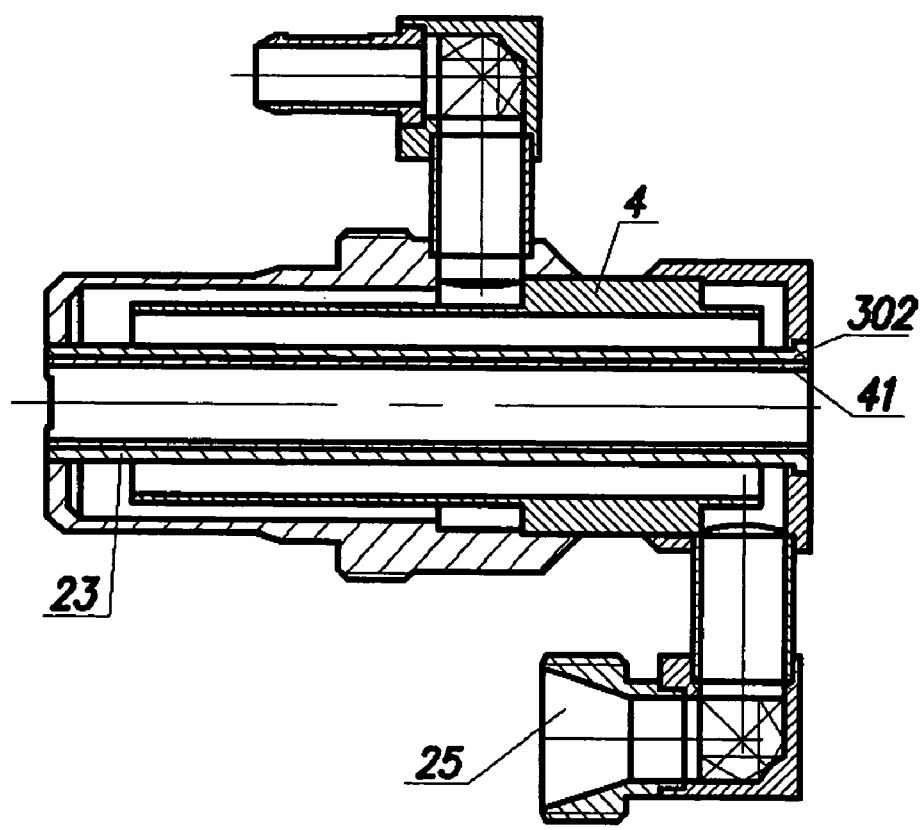
FIG. 14 is a cross-sectional view of an embodiment of a double sleeve barrel that may be employed with an HVTS apparatus consistent with the present disclosure.

FIG. 14 illustrates an embodiment of a barrel module M4 in which the barrel 23 includes an inner sleeve 41 and an outer sleeve 302. Consistent with this embodiment, the inner sleeve 41 of the barrel 23 may be formed from a material having a higher thermal conductivity than the outer sleeve 302. Contact of the inner sleeve 41, which is heated by the gases and/or products of the combustion process, by the outer sleeve 302 may remove heat from the inner sleeve 41, but at a rate that is lower than a system using only a material with a high thermal conductivity. Accordingly, the temperature of the barrel, as well as any other components utilizing a similar configuration, may be more effectively controlled without removing too much heat and thereby reducing the temperature of the combustion gases traveling through the barrel below a desired level. Consistent with one embodiment, an inner and outer sleeve arrangement may allow an HVTS apparatus that more efficiently contains the heat in the jet of combustion gases emerging from the gun on the order of between about 5 to 10% as compared to a single layer construction. Furthermore, the use of an inner sleeve 41 having a higher thermal conductivity than the outer sleeve 302 may decrease the occurrence of material, e.g. powder, build-up inside the barrel 23. In one embodiment consistent with this aspect, the inner sleeve 41 may be formed from copper or a copper alloy and the outer sleeve 302 may be formed from a material such as stainless steel or a nickel based alloy.

In some instances, high temperature materials such as Ni and Co based alloys, and carbides may require a longer dwell time in a stream of hot combustion gases in order to achieve a desired temperature for efficient coating compared to other lower temperature materials. Longer particle dwell times may be provided by increasing the length of the barrel of a thermal spray apparatus. However, a longer barrel may generally result in a greater amount of heat loss, and an increased probability that the material will build up on an interior wall of the barrel of the thermal spray apparatus.

Consistent with a further embodiment, the dwell time of particles in a stream of hot combustion gases in a high velocity thermal spray apparatus may be controlled by providing an additional combustion region downstream of the combustion module M1 for producing a secondary stream of hot gases inside of a secondary barrel. The additional combustion region may be provided located around the primary barrel of the barrel module M4. Consistent with one embodiment, the secondary barrel may have a larger diameter than the primary barrel. According to such an embodiment, the velocities of the primary and second streams of combustion gases, generated by the combustion module M1 and secondary combustion region respectively, may be controlled by the respective combustion pressures and relative geometries of the barrels.

Figure 15:
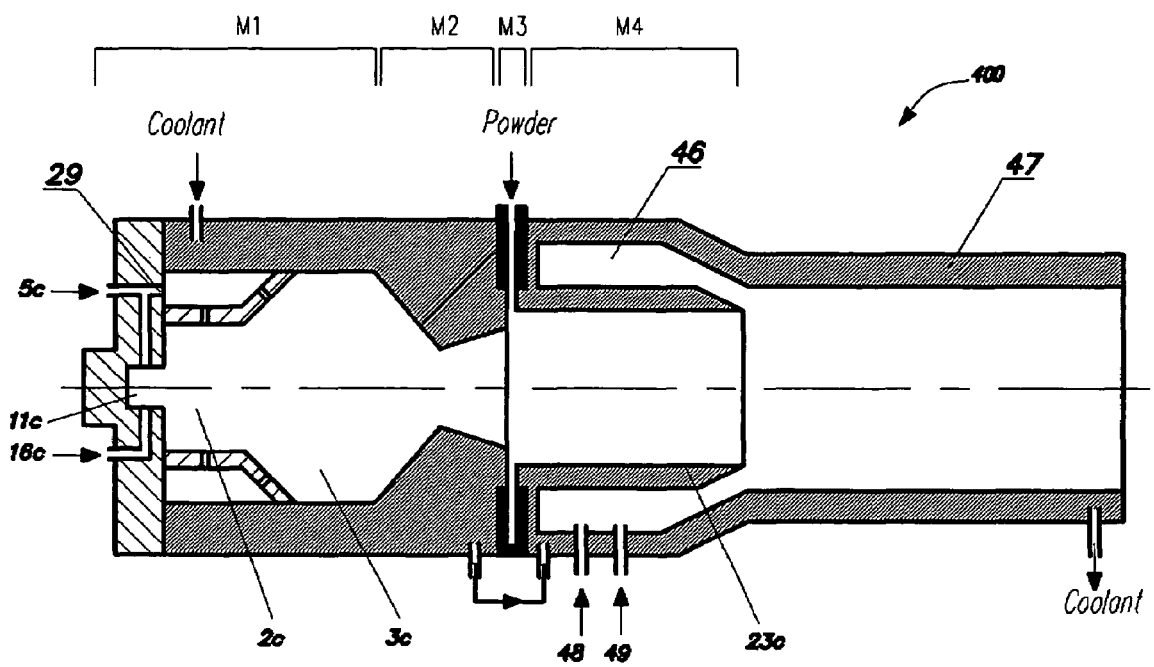
FIG. 15 is a schematic illustration of an embodiment of an HVTS apparatus including a secondary combustion region.

Turning to FIG. 15, a further embodiment of an HVTS apparatus 400 is schematically illustrated. Consistent with this further embodiment, the HVTS apparatus 400 may include an ignition zone 11c, a pre-combustion chamber 2c and a combustion chamber 3c that may be generally configured as described above. Specifically, an oxidizer inlet 5c may supply an oxidizer to the apparatus 400. The oxidizer may be distributed through an oxidizer collector 6c to the ignition zone 11c, the pre-chamber 2c, and the combustion chamber 3c in a manner generally consistent with the preceding embodiments. Similarly, fuel may be supplied through a fuel inlet 16c and distributed in the ignition zone 11c, pre-chamber 2c, and combustion chamber 3c in a manner generally consistent with the preceding embodiments. Furthermore, the HVTS apparatus 400 may include a forming module M2, powder module M3, and barrel module M4 that are generally consistent with the preceding embodiments.

The HVTS apparatus 400 may also include a secondary oxidizer supply 48 and a secondary fuel supply 49 into a secondary combustion device 46 disposed around the primary barrel 23c. As illustrated, the secondary combustion device 46 may generally provide a mixing chamber for the oxidizer and fuel supplied through the secondary oxidizer and fuel supplies 48, 49. The primary gas stream, generated in the combustion module M1, i.e., the ignition zone 11c, pre-combustion chamber 2c, and combustion chamber 3c, may exit the primary barrel 23c, may ignite the mixture of oxidizer and fuel in the secondary combustion device 46. The combustion products, or gases, for the combustion module M1 and from the secondary combustion device 46 may flow through the secondary barrel 47. The secondary barrel may extend the dwell time of particles in a high temperature stream, and thereby reduce the probability of a build up of particles on the wall of the secondary barrel 47.

Figure 16:
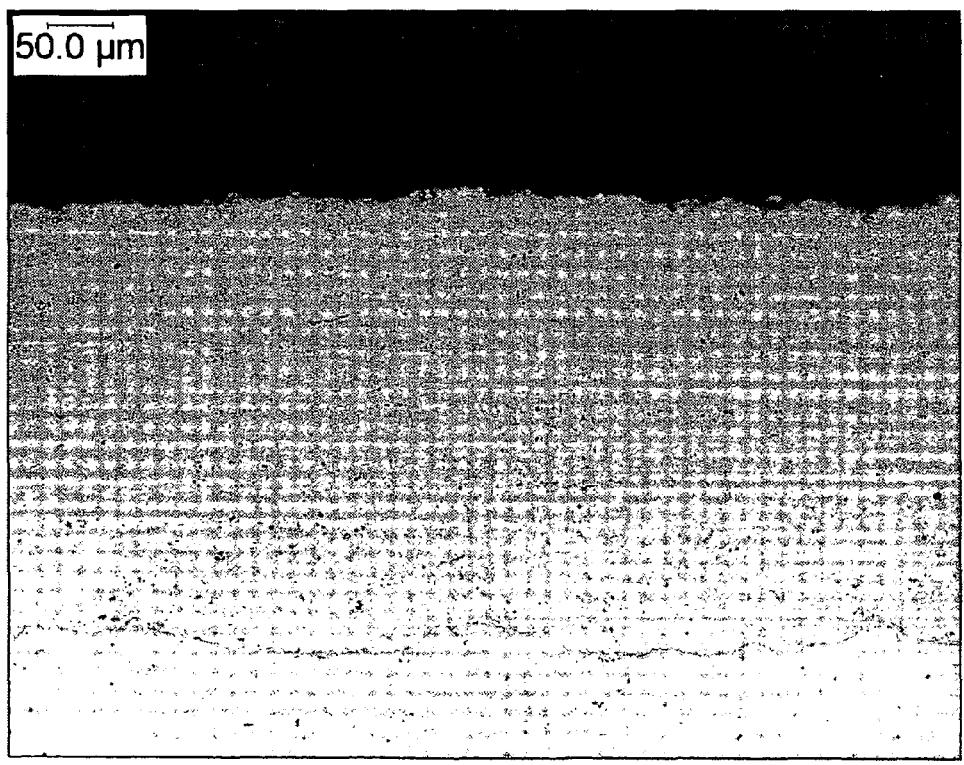
FIG. 16 is a magnified cross-section of a WC-12Co coating sprayed by an HVTS apparatus herein.

FIG. 16 is a magnified image of a WC-12Co coating sprayed using an HVTS apparatus consistent with one of the embodiments described herein. Microhardness testing was performed on the cross-sections with a Vickers microhardness tester using a load of 300 grams ($HV_{0.3}$). The coating exhibited a microhardness $HV_{0.3}$ measured on three sample coupons in the range of between about 1390 to 1520 utilizing 10 indentations for each average microhardness value. While not intending to be bound to any particular theory, it is believed that the measured microhardness values may be attributed to a very high coating density, i.e., a coating having a minimum of voids, and minimized amount of defects in the coating sprayed by HVTS apparatus.

Consistent with one aspect, a combustion module M1 consistent with the present disclosure may provide improved efficiency by preheating and at least partially evaporating liquid fuel in the pre-chamber. The evaporated fuel may not require as much space in the combustion chamber to achieve complete combustion, as compared to atomized liquid drops or a liquid film of fuel. The combustion chamber volume, and therein the surface area of the combustion chamber walls, may be reduced relative to what would be required to achieve full combustion of non-evaporated fuel, e.g., atomized fuel or a liquid film of fuel. A smaller surface area of the combustion chamber walls may result in smaller heat losses from the combustion chamber to a cooling medium, such as water. A smaller heat loss from the combustion chamber may provide a higher thermal efficiency of combustion (Ef) and an increase in the temperature of the combustion products, i.e. gaseous products of the combustion of the oxidizer and fuel. According to one aspect, a higher thermal efficiency of the combustion may allow an increased level of dissociation of the combustion products (Dcc). Estimated dissociation levels in combustion products for alcohol/oxygen are summarized in Table 1 below

TABLE 1

Estimate of combustion temperature (Tcc) and level of dissociation (Dcc) at different levels of thermal efficiency (Ef) for alcohol/oxygen combustion in a combustion chamber operating at a combustion pressure of 0.9 MPa.

| Ef, % | 100 | 95 | 90 | 85 | 80 | 70 | 60 |
|---|---|---|---|---|---|---|---|
| Tcc, K | 3209 | 3151 | 3090 | 3024 | 2953 | 2792 | 2591 |
| Dcc, % | 44 | 41 | 38 | 34 | 32 | 25 | 19 |

Dissociated products may be subject to recombination downstream of the combustion chamber. Recombination may be more intensive in areas having a lower temperature, for example near water or air cooled walls of the barrel. Recombination may cause an increase in the local temperature, and may reduce a radial gradient of the combustion jet, i.e., stream of combustion gases, temperature and velocity. A higher temperature and a higher velocity of the combustion jet and a lower radial gradient of the combustion jet parameters, in combination with an optimized powder injection, may allow a higher deposit efficiency, homogeneity and quality of the coatings.

In an embodiment using hydrogen peroxide, or an aqueous solution of hydrogen peroxide, as an oxidizer the HVTS apparatus may be equipped with a catalytic converter in an oxidizer supplying line. The catalytic converter may convert liquid hydrogen peroxide or hydrogen peroxide solutions into a preheated gaseous state. Different catalytic materials (catalysts) may include various permanganates, manganese dioxide, platinum and iron oxide. Combustion temperatures of fuel/aqueous hydrogen peroxide may depend on a concentration of hydrogen peroxide in the solution. Estimated of combustion temperatures for alcohol fuel systems using at different concentrations of aqueous hydrogen peroxide solution are summarized in Table 2 below.

TABLE 2

Combustion temperatures of alcohol fuel/aqueous hydrogen peroxide systems operating at a combustion pressure of 20 bars (2 MPa).

| $H_2O_2$, % | 100 | 60 | 50 | 40 | 30 |
|---|---|---|---|---|---|
| $T_{cc}$, K | 2800 | 1490 | 1090 | 840 | 590 |

Accordingly, consistent with the present disclosure there is provided a high velocity combustion apparatus that may provide complete combustion of fuel and minimize or eliminate free carbon and/or unburned fuel in the combustion exhaust jet, thereby allowing improved coatings that do not contain free carbon and/or unburned fuel. Furthermore, the apparatus of the present disclosure may provide a combustion chamber having a smaller surface area, thereby allowing a reduction in heat losses from the combustion chamber. Consistent with the first aspect, the smaller combustion chamber surface area may be achieved while still providing complete combustion. According to one aspect, the high velocity combustion apparatus may use liquid fuel that may be pre-heated and evaporated in a pre-combustion chamber prior to primary combustion in the combustion chamber.

The various embodiments described herein above have been provided for the purpose of illustrating features and advantages of the claimed subject matter. The described embodiments are susceptible to variation and modification consistent with the invention and should not be construed as limiting the scope of the invention as defined by the claims appended herein.

What is claimed is:

1. A combustion apparatus comprising:
a pre-combustion chamber comprising an ignition zone and an exit, said pre-combustion chamber further comprising a fuel inlet and a first oxidizer inlet adjacent said ignition zone, said first oxidizer inlet providing a first oxidizer flow rate proximate said ignition zone insufficient to combust all of said fuel provided by said fuel inlet proximate said ignition zone, a second oxidizer inlet providing a second oxidizer flow rate into said pre-combustion chamber adjacent said exit, and a third oxidizer inlet providing a third oxidizer flow rate into said pre-combustion chamber between said ignition zone and said second oxidizer inlet, wherein said first oxidizer inlet accounts for between about 5-10% of total oxidizer inlet, said second oxidizer inlet accounts for between about 50-80% of total oxidizer inlet, and said third oxidizer inlet accounts for between about 10-40% of total oxidizer inlet; and
a combustion chamber comprising an entrance and an exhaust, said entrance in communication with said pre-combustion chamber exit.

2. A combustion apparatus according to claim 1 wherein said fuel inlet is directed tangentially relative to a wall of said ignition zone.

3. A combustion apparatus according to claim 1 comprising a spark plug disposed adjacent to said ignition zone.

4. A combustion apparatus according to claim 1 wherein said second and third oxidizer inlets comprise a first and a second pattern of holes in a wall defining said pre-combustion chamber.

5. A combustion apparatus according to claim 1, further comprising a forming module comprising an inlet coupled to said exhaust of said combustion chamber and an exit.

6. A combustion apparatus according to claim 5 wherein said forming module is directly coupled to said exhaust of said combustion chamber.

7. A combustion apparatus according to claim 5, said forming module comprising a converging zone coupled to said exhaust of said combustion chamber, said converging zone leading to a throat having a predetermined diameter, and said throat being coupled to an entrance of an expansion zone, said expansion zone having an exit diameter greater than said diameter of said throat.

8. A combustion apparatus according to claim 7, said forming module further comprising a cylindrical zone coupled to said expansion zone exit, said cylindrical zone having a diameter substantially equal to said expansion zone exit diameter.

9. A combustion apparatus according to claim 5, further comprising a barrel coupled to said exit of said forming module.

10. A combustion apparatus according to claim 9 wherein said barrel is directly coupled to said exit of said forming module.

11. A combustion apparatus according to claim 8, further comprising a barrel coupled to an exit of said forming module.

12. A combustion apparatus according to claim 11 wherein said barrel is directly coupled to said exit of said forming module.

13. A combustion apparatus according to claim 1 further comprising a powder injector introducing powder material into a stream of combustion gases from said combustion chamber.

14. A combustion apparatus according to claim 13 wherein said powder injector is disposed adjacent a low pressure region of said stream of combustion gases.

15. A combustion apparatus according to claim 1 wherein a distance between said second and said third oxidizer inlets is between approximately 0.1*L to approximately 0.7*L wherein L is defined as a length of said pre-combustion chamber.

16. A combustion apparatus according to claim 1 wherein a distance between said second and said third oxidizer inlets is between approximately 0.2*L to approximately 0.5*L wherein L is defined as a length of said pre-combustion chamber.

17. A method of generating a combustion exhaust stream comprising:
providing a combustion system comprising a pre-combustion chamber and a combustion chamber;
supplying fuel into said pre-combustion chamber through a fuel inlet proximate an ignition zone of said pre-combustion chamber;
supplying a first oxidizer flow rate through a first oxidizer inlet into said pre-combustion chamber proximate said ignition zone insufficient to combust all of said fuel provided by said fuel inlet proximate said ignition zone, wherein said first oxidizer flow rate accounts for between about 5-10% of total oxidizer inlet;

supplying a second oxidizer flow rate through a second oxidizer inlet into said pre-combustion chamber adjacent an exit of said pre-combustion chamber;

supplying a third oxidizer flow rate through a third oxidizer inlet into said pre-combustion chamber between said ignition zone and said second oxidizer inlet, wherein said third oxidizer flow rate accounts for between about 10-40% of total oxidizer inlet;

providing a preheating combustion in said pre-combustion chamber, comprising evaporating at least a portion of said fuel supplied to said pre-combustion chamber;

providing a primary combustion in said combustion chamber, comprising providing a supply of oxidizer through said second oxidizer inlet, wherein said second oxidizer flow rate accounts for between about 50-80% of total oxidizer inlet.

18. A method according to claim 17 wherein said fuel comprises alcohol.

19. A method according to claim 17 wherein said fuel comprises kerosene.

20. A method according to claim 17 wherein said oxidizer comprises oxygen.

21. A method according to claim 17 further comprising providing said third oxidizer inlet a distance between approximately 0.1*L to approximately 0.7*L from said second oxidizer inlet, wherein L is defined as a length of said pre-combustion chamber.

22. A method according to claim 17 further comprising providing said third oxidizer inlet a distance between approximately 0.2*L to approximately 0.5*L from said second oxidizer inlet, wherein L is defined as a length of said pre-combustion chamber.

* * * * *